(12) United States Patent
Shirashima et al.

(10) Patent No.: US 12,149,191 B2
(45) Date of Patent: Nov. 19, 2024

(54) VIBRATION GENERATOR AND VIBRATION GENERATION METHOD

(71) Applicant: Alps Alpine Co., LTD, Tokyo (JP)

(72) Inventors: Hitoshi Shirashima, Fukushima (JP); Kazuhiko Kinemura, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 66 days.

(21) Appl. No.: 18/082,301

(22) Filed: Dec. 15, 2022

(65) Prior Publication Data

US 2023/0198442 A1 Jun. 22, 2023

(30) Foreign Application Priority Data

Dec. 17, 2021 (JP) .................. 2021-204997

(51) Int. Cl.
*H02P 25/034* (2016.01)
*G06F 3/01* (2006.01)
*H02K 33/18* (2006.01)

(52) U.S. Cl.
CPC ............ *H02P 25/034* (2016.02); *G06F 3/016* (2013.01); *H02K 33/18* (2013.01)

(58) Field of Classification Search
CPC ........ H02P 25/034; G06F 3/016; H02K 33/18
USPC ........................................................ 318/114
See application file for complete search history.

(56) References Cited

U.S. PATENT DOCUMENTS 9,310,914 B2  4/2016  Kamata et al.
9,684,377 B2  6/2017  Taninaka et al.
2010/0309141 A1*  12/2010  Cruz-Hernandez ..... G06F 3/016
   345/173
2018/0246571 A1*  8/2018  Jeitner .................. G06F 3/0383
2019/0163277 A1*  5/2019  Kanai .................. G06F 3/0416
2019/0212868 A1  7/2019  Ueno (Continued)

FOREIGN PATENT DOCUMENTS

EP      3805901 A1 *  4/2021  ............ G06F 3/016
JP      2018-45407       3/2018
JP      2016-170766 A    9/2018

(Continued)

OTHER PUBLICATIONS

Extended European Search Report from corresponding European application No. 22205335.7-1224, Apr. 20, 2023, 10 pp.

(Continued)

*Primary Examiner* — Kawing Chan
(74) *Attorney, Agent, or Firm* — Crowell & Moring LLP

(57) ABSTRACT

A drive signal output section of a vibration generator outputs a one-shot drive signal, as a first drive signal, that rises on a positive side when a vibrator is vibrated, that has a voltage changing on the positive side, and that applies force to move the vibrator or a vibration target vibrated in conjunction with the vibration of the vibrator in a first direction, and thereafter, outputs a one-shot drive signal, as a second drive signal, such that a timing when a movement of the vibrator or the vibration target peaks in a second direction that is opposite to the first direction coincides with a timing of start of rise of the signal, so as to increase amplitude of the vibration of the vibrator or the vibration target by the one-shot signal that is not displaced on a negative side.

12 Claims, 8 Drawing Sheets

(56) References Cited

U.S. PATENT DOCUMENTS

2020/0036786 A1* 1/2020 Yoneda .................. H04L 67/12

FOREIGN PATENT DOCUMENTS

| JP | 2021-97004 A | 6/2021 |
| WO | WO 2013/186849 A1 | 12/2013 |
| WO | WO 2015/083283 A1 | 6/2015 |
| WO | WO 2018/092833 A1 | 5/2018 |
| WO | WO 2020/111043 A1 | 6/2020 |
| WO | WO 2021-058863 A1 | 4/2021 |

OTHER PUBLICATIONS

Japanese Office Action with English translation, Sep. 27, 2024, pp. 1-5, issued in Japanese Patent Application No. 2021-204997.

* cited by examiner

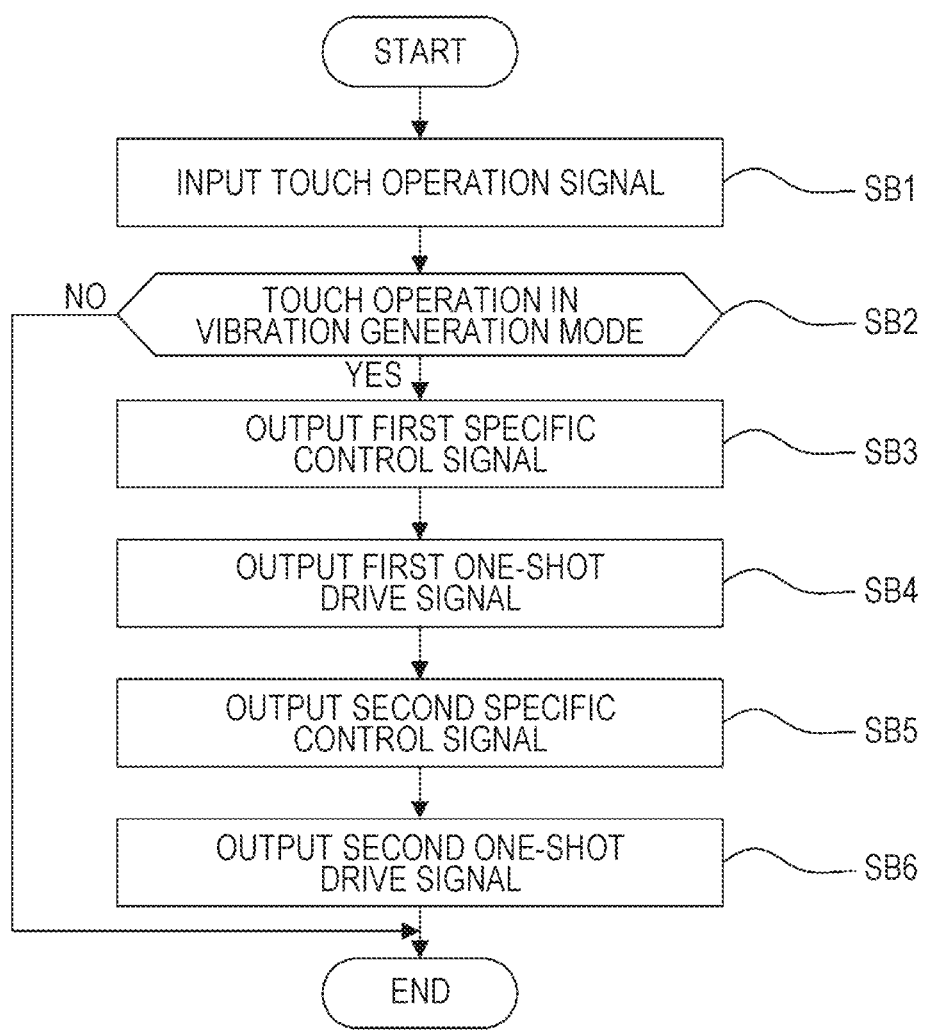

VIBRATION GENERATOR AND VIBRATION GENERATION METHOD

RELATED APPLICATION

The present application claims priority to Japanese Patent Application Number 2021-204997, filed Dec. 17, 2021, the entirety of which is hereby incorporated by reference.

BACKGROUND

1. Field of the Invention

The present disclosure relates to a vibration generator and a vibration generation method, and is particularly suitable for use in a vibration generator and a vibration generation method that generate vibration by outputting a drive signal to an actuator.

2. Description of the Related Art

In general, a vibration generator is known that vibrates a touch object for imparting a vibratory tactile sensation to a user when the user touches the touch object, such as when the user touches a touch panel. Some vibration generators output a drive signal to an actuator so as to vibrate a vibrator of the actuator. Various techniques have been disclosed for such a vibration generator.

For example, JP 2021-097004 A discloses a technique of causing a sharp vibratory tactile sensation by controlling a drive timing of an actuator 130 in an operation device 100 (a vibration generator) that causes a tactile control microcomputer 160 to output a reproduction start signal (a drive signal) to the actuator 130 to generate vibration. Furthermore, for example, JP 2016-170766 A discloses a technique of reducing, in an operation input device 1 (a vibration generator) that outputs a control signal from an operation input ECU10 to a drive circuit 5 and generates vibration by outputting a drive signal to a piezoelectric element 4 from a drive circuit 5, vibration noise at a timing of ON/OFF switching by performing switching between a control signal that turns on vibration in a resonance frequency and a control signal that turns off vibration in a frequency larger than the resonance frequency.

For example, JP 2018-045407 A discloses a technique of presenting, in a tactile presentation device 1 (a vibration generator) in which a drive signal is output from a controller 18 to an actuator 16 to generate vibration, a state of a touch object by driving the actuator 16 when a load in a touch operation is equal to or larger than a certain level. For example, International Publication No. 2013/186849 discloses a technique of providing, in an electronic apparatus 100 (a vibration generator) that generates vibration by outputting a driving signal to an LRA (Linear Resonant Actuator) 140 through a driver IC 260 from a CPU 210, tactile sensation in response to an operation by outputting a drive signal that is a sine wave of a resonance frequency of an actuator and stops driving vibration of the actuator at a point other than a center point of amplitude of the sine wave. For example, International Publication No. 2015/083283 discloses a technique of providing, in an electronic apparatus 100 (a vibration generator) that generates vibration by outputting a drive signal from a CPU 210 through a driver IC 260 to an LRA 140, a tactile sensation in response to an operation when a resonance frequency of the device changes in accordance with an acceleration amplitude by controlling a waveform of the drive signal.

In a vibration generator that generates vibration by means of a drive signal, a simplest waveform of the drive signal is a sine wave that reciprocates between positive and negative potentials with 0 V as a vibration center, as indicated by a reference character A in FIG. 10. However, when the drive signal having such a waveform is to be obtained, a negative potential is required to be generated in a drive circuit that outputs the drive signal, and therefore, a circuit configuration of the drive circuit is complicated, resulting in an increase in cost.

To address this problem, in general, a bias is applied to a drive signal to push up a voltage at a center of vibration so that the voltage of the drive signal does not fall below 0 V. A reference character B in FIG. 10 indicates a waveform of a drive signal obtained after biasing. In this case also, however, a peak value of a voltage of the drive signal rises, and accordingly, a dedicated voltage booster circuit is required to be added, resulting in an increase in cost.

Even when cost reduction can be achieved in solving these general problems, it would be undesirable if vibration generated by the vibration generator is inappropriately weakened and a desired vibration may not be obtained, and therefore, this situation is naturally to be avoided.

SUMMARY

The present disclosure is made to address these problems and reduce cost while preventing inappropriately weakened vibration in a vibration generator that generates vibration in accordance with a drive signal.

According to the present disclosure, a drive signal output from the drive signal output section is a "one-shot signal that rises on the positive side and has a voltage value changing on the positive side", and therefore, a negative potential is not required to be generated in the drive circuit, and furthermore, the drive signal is not required to be biased, resulting in reduction in cost. Since a drive signal output from the drive signal output unit in the present disclosure is a one-shot signal, for example, when only one one-shot drive signal is output to vibrate a vibrator of an actuator or a vibration target that is vibrated in conjunction with vibration of the vibrator, or when a one-shot drive signal is randomly output, sufficiently strong vibration may not be obtained.

On the other hand, according to the present disclosure, the one-shot drive signal applies force to move the vibrator or the vibration target in the first direction. In the present disclosure, to vibrate the vibrator or the vibration target, a second one-shot drive signal is output after a first one-shot drive signal is output such that a timing when a movement of the vibrator or the vibration target reaches its peak in the second direction, which is the opposite direction of the first direction, coincides with a timing when the signal starts rising. Therefore, the movement of the vibrator or the vibration target in the second direction due to the vibration peaks and the elastic energy peaks, and accordingly, at the timing when the movement in the first direction is started, the one-shot drive signal may apply force to move the vibrator or the vibration target in the first direction. Accordingly, the second one-shot drive signal may effectively accelerate the movement of the vibrator or the vibration target in the first direction so as to suppress inappropriate weakening of the vibration of the vibrator or the vibration target.

In other words, according to the present disclosure, reduction in cost is achieved while inappropriate weakening of the vibration generated by the vibration generator is suppressed.

BRIEF DESCRIPTION OF THE DRAWINGS

FIG. 8 is a flowchart of an example of an operation of the vibration generator according to the embodiment of the present disclosure;

DETAILED DESCRIPTION OF THE PREFERRED EMBODIMENTS

Figure 1:
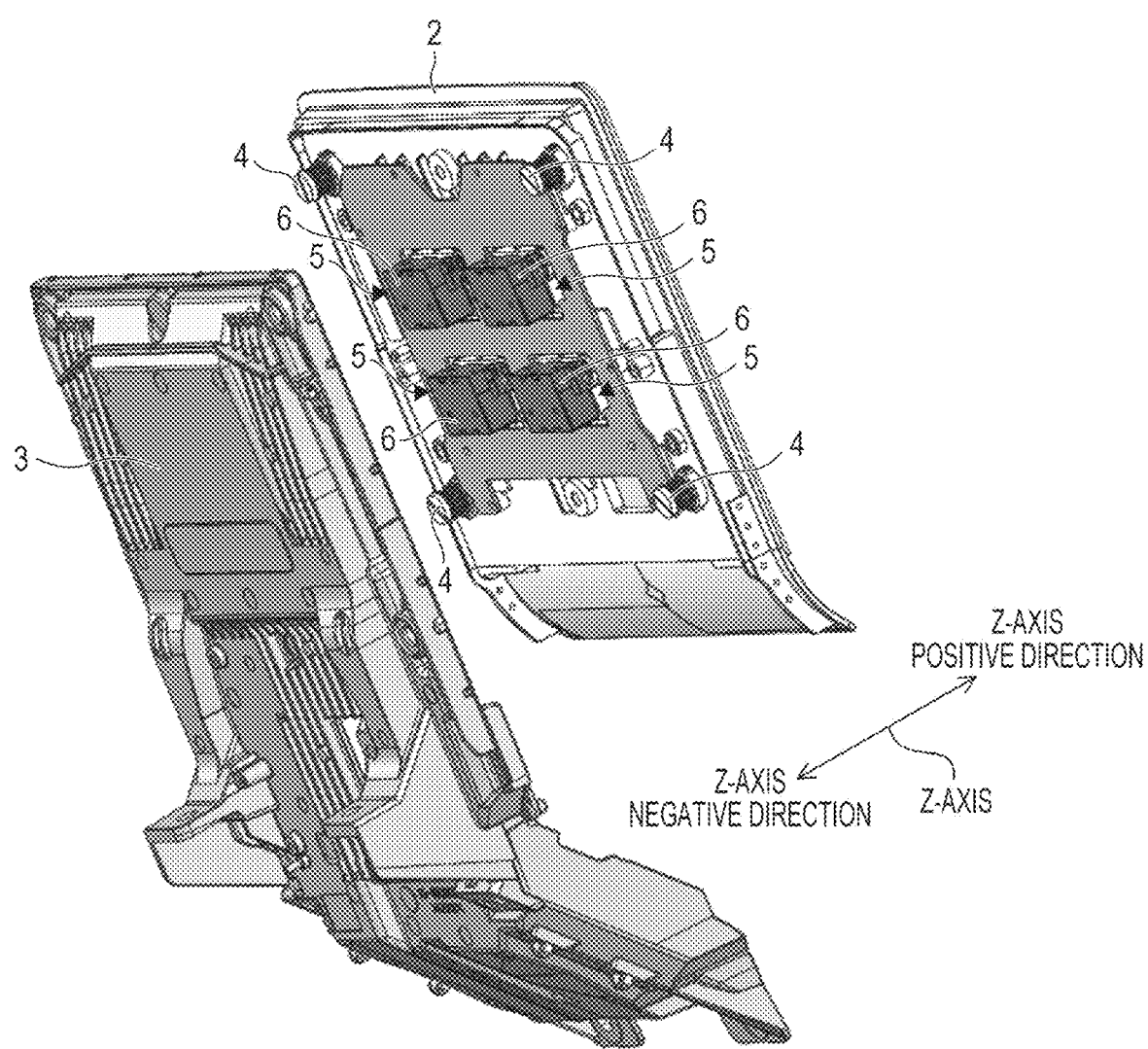
FIG. 1 is a perspective view of a touch screen and associated members.

Hereinafter, an embodiment of the present invention will be described with reference to the accompanying drawings. FIG. 1 is a perspective view of a touch screen 2 that is a target of generation of vibration performed by a vibration generator 1 (FIG. 4) according to this embodiment and components associated with the touch screen 2, viewed from a rear side. The touch screen 2 is a device installed in a center cluster of a vehicle (or elsewhere, of course), and includes a display panel, such as a liquid crystal display or an organic EL panel, and a touch sensor superimposed on the display panel. The touch screen 2 has a function of displaying images on a screen formed at a front thereof and a function of detecting a touch operation performed on the screen. The touch screen 2 is a component that is subjected to a touch operation performed by a user.

A housing 3 is mounted on the center cluster of the vehicle, and the touch screen 2 is attached to the housing 3. FIG. 1 is a diagram illustrating a state in which the touch screen 2 is detached from the housing 3. More specifically, elastic rubber pushes 4 are disposed at four corners of a back surface of the touch screen 2, and the touch screen 2 is attached to the housing 3 through the rubber pushes 4. Specifically, the touch screen 2 is supported on the housing 3 through the elastic rubber pushes 4.

As illustrated in FIG. 1, four vibration units 5 are disposed on the back surface of the touch screen 2. The vibration units 5 are devices that generate vibration on the touch screen 2 under the control of the vibration generator 1. Each of the vibration units 5 includes a box-shaped case 6 including an actuator 7 (FIG. 2) that serves as a vibration source.

Figure 2:
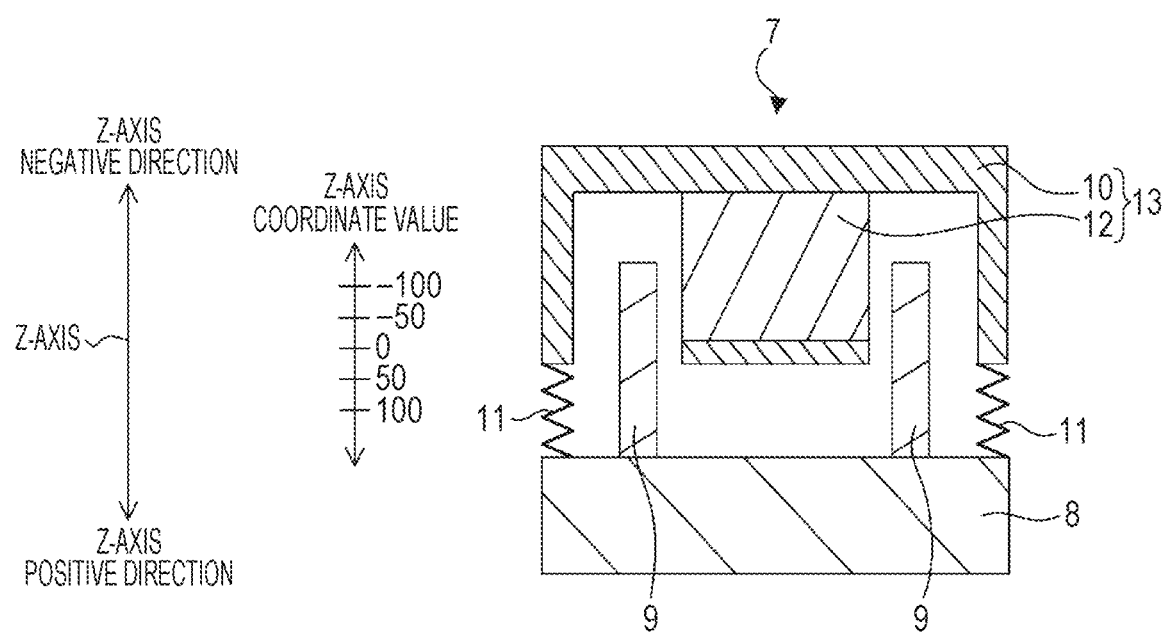
FIG. 2 is a cross-sectional view of an actuator.

FIG. 2 shows a cross-sectional view of the actuator 7. Note that FIG. 2 is used to illustrate the principle of the actuator 7 according to this embodiment, and a structure is simplified and scaled down in a manner suitable for description. As illustrated in FIG. 2, in each of the vibration units 5, the actuator 7 has a base member 8 fixed to the case 6 (FIG. 1) of the vibration unit 5, and a coil 9 attached to the base member 8. The case 6 is fixed to the back surface of the touch screen 2. A yoke member 10 is disposed in a position opposite to the base member 8. The yoke member 10 is supported by the base member 8 via an elastic member 11 composed of a spring. A magnet 12 is mounted at a center of a bottom of the yoke member 10. A portion of a tip end of the magnet 12 is inserted into an inner circumference of the coil 9. A portion of the yoke member 10 is disposed at the tip end of the magnet 12.

When a drive signal is input to the coil 9, the Lorentz force is generated in the coil 9, and the yoke member 10 (and the magnet 12 fixed to the yoke member 10) supported by the base member 8 through the elastic member 11 vibrates. The yoke member 10 and the magnet 12 are integrally vibrated and are hereinafter collectively referred to as a "vibrator 13". When the vibrator 13 vibrates in response to a drive signal, the vibration of the vibrator 13 is transmitted to the base member 8 and the case 6, the vibration of the base member 8 and the case 6 is further transmitted to the touch screen 2, and then the touch screen 2 is vibrated. In other words, the touch screen 2 vibrates in conjunction with the vibration of the vibrator 13. Furthermore, in this embodiment, the elastic member 11 is attached to the base member 8, the vibrator 13 is supported by the base member 8 through the elastic member 11 in a vibration available manner, and the touch screen 2 vibrates integrally with the base member 8. The touch screen 2 corresponds to a "vibration target" in the claims.

Referring to FIGS. 1 and 2, in this embodiment, a normal direction to the screen of the touch screen 2 (a depth direction when the screen of the touch screen 2 is viewed from the front) is defined as a "Z axis". A position of the vibrator 13 when the vibrator 13 is not vibrated is referred to as a "reference position", a direction toward a front of the reference position (toward a near side when viewing the screen of the touch screen 2 from front) is defined as a "Z-axis positive direction", and a direction toward a rear of the reference position (toward a depth side when viewing the screen of the touch screen 2 from front) is defined as a "Z-axis negative direction".

The vibrator 13 vibrates along the Z-axis. More specifically, the vibrator 13 moves in the Z-axis negative direction, starts a reverse movement in the Z-axis positive direction when the movement peaks in the Z-axis negative direction, further moves in the Z-axis positive direction until the reference position is passed and the movement peaks in the Z-axis positive direction, and starts a reverse movement in the Z-axis negative direction. This movement is repeatedly performed for vibration.

Referring to FIG. 2, coordinate values are defined on the Z-axis (hereinafter referred to as "Z-axis coordinate values") in this embodiment. Absolute values of the Z-axis coordinate values are increased as the coordinate values, which are positive values in the Z-axis positive direction, are farther away from the reference position having a coordinate value of "0" and are increased as the coordinate values, which are negative values in the Z-axis negative direction, are farther away from the reference position. Note that, in FIG. 2, a line segment indicating the Z-axis coordinate values is marked with a scale, and specific Z-axis coordinate values are assigned as an example.

Figure 3:
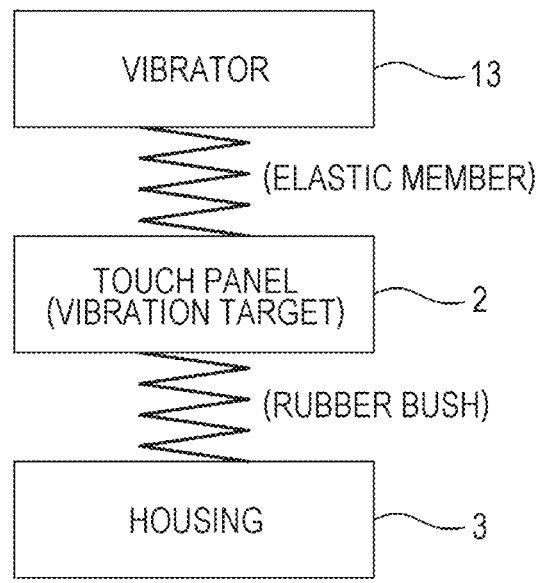
FIG. 3 is a diagram illustrating the relationship between a housing, a touch screen, and a vibrator.

FIG. 3 is a diagram schematically illustrating the relationship between the housing 3, the touch screen 2, and the vibrator 13. As illustrated in FIG. 3, in this embodiment, the touch screen 2 is supported by the housing 3 via the elastic rubber push 4. The vibrator 13 is supported by the elastic member 11 on the touch screen 2. Vibration of the vibrator 13 is transmitted to the touch screen 2 through the elastic member 11. The touch screen 2 is coupled to the housing 3 through the rubber push 4, and therefore, can be oscillated on the housing 3. Therefore, when the vibration of the vibrator 13 is transmitted to the touch screen 2, the touch screen 2 vibrates on the housing 3 accordingly.

Figure 4:
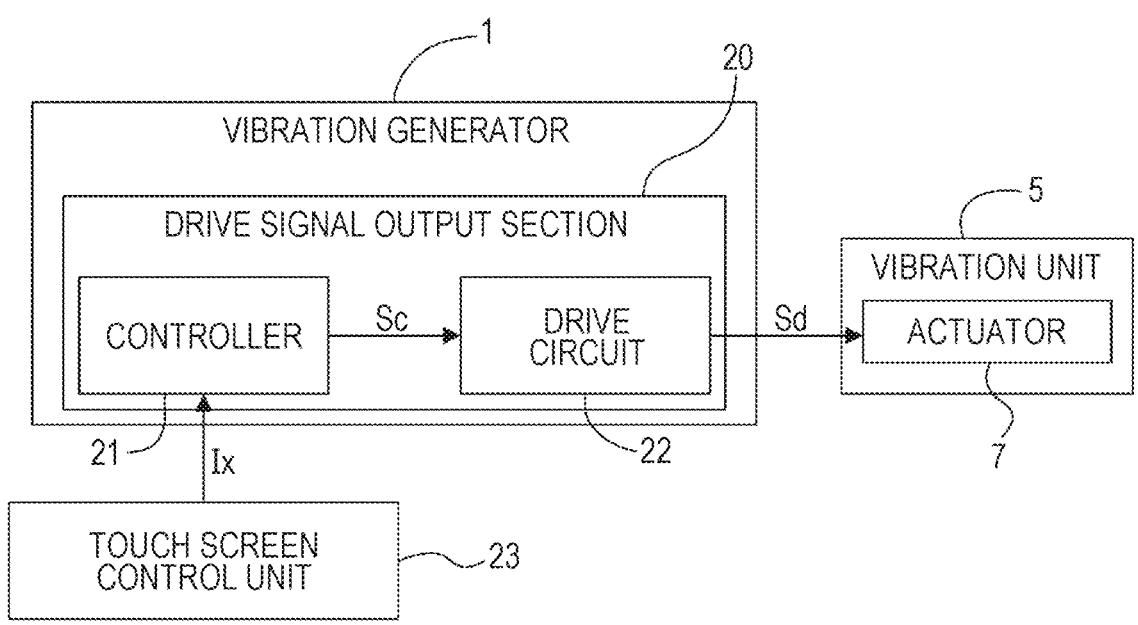
FIG. 4 is a block diagram illustrating an example of a functional configuration of a vibration generator according to an embodiment of the present disclosure.

FIG. 4 is a block diagram illustrating an example of a functional configuration of the vibration generator 1 according to this embodiment. As illustrated in FIG. 4, the vibration generator 1 includes a drive signal output section 20, and the drive signal output section 20 includes a controller 21 and a drive circuit 22. The above functional blocks 20 to 22 may be configured by hardware, a DSP (Digital Signal Processor), or software. When one of the functional blocks 20 to 22 is configured by software, for example, the functional block includes a CPU (central processing unit), a RAM (random access memory), and a ROM (read only memory) of a computer in practice and is realized when a program stored in a recording medium, such as the RAM, the ROM, a hard disk, or a semiconductor memory, is operated.

The vibration generator 1 of this embodiment has a function of imparting a vibratory tactile sensation to the user by vibrating the touch screen 2 when a touch operation (a contact operation) is performed in a predetermined mode by the user on the touch screen 2. The following describes operation of the vibration generator 1, focusing on a process performed when the touch screen 2 is vibrated in response to a touch operation.

The touch screen 2 includes a touch screen control unit 23 (FIG. 4) that controls various sections of the touch screen 2. When detecting a touch operation with a certain level of intensity of pressure (hereinafter referred to as "pressure intensity") on the screen formed on the front surface of the touch screen 2, the touch screen control unit 23 outputs a touch operation signal Ix indicating a position of the touch operation on the screen (e.g., a coordinate value of a coordinate system of the screen) and the pressure intensity of the touch operation to the controller 21 of the vibration generator 1.

When receiving the touch operation signal Ix, the controller 21 recognizes the position and the pressure intensity of the touch operation and determines whether the touch operation has been performed in a vibration generation mode. In this embodiment, the controller 21 determines whether a predetermined condition (hereinafter referred to as a "vibration generation condition") has been satisfied. When the determination is affirmative, the controller 21 determines that the touch operation has been performed in the vibration generation mode, and otherwise, the controller 21 determines that the touch operation has not been performed in the vibration generation mode. In this embodiment, as the vibration generation condition, a position of a touch operation is included in a "specific region in the screen" and pressure intensity is equal to or larger than a threshold. The specific region in the screen may be fixed, or may be dynamically changed according to content of a video displayed on the screen. The content of the vibration generation condition is not limited to those illustrated in this embodiment. For example, as the vibration generation condition, the pressure intensity is equal to or larger than the threshold regardless of the position of the touch operation.

When determining that a touch operation has been performed in the vibration generation mode, the controller 21 executes the following process. Specifically, the controller 21 outputs a specific control signal Sc to the drive circuit 22. The specific control signal Sc causes the drive circuit 22 to output a one-shot drive signal Sd (described below). Hereinafter, the specific control signal Sc output by the controller 21 for the first time after determining that a touch operation has been performed in the vibration generation mode is especially referred to as a "first specific control signal Sc-1".

When receiving the first specific control signal Sc-1 from the controller 21, the drive circuit 22 outputs a one-shot drive signal Sd as a drive signal to the actuators 7 of all the vibration units 5. Specifically, the drive circuit 22 energizes the coils 9 of the respective actuators 7 in accordance with a waveform of the one-shot drive signal Sd. Hereinafter, the one-shot drive signal Sd output by drive circuit 22 in response to the first specific control signal Sc-1 is especially referred to as a "first one-shot drive signal Sd-1". The first one-shot drive signal Sd-1 corresponds to a "first drive signal" in the claims.

Figure 5:
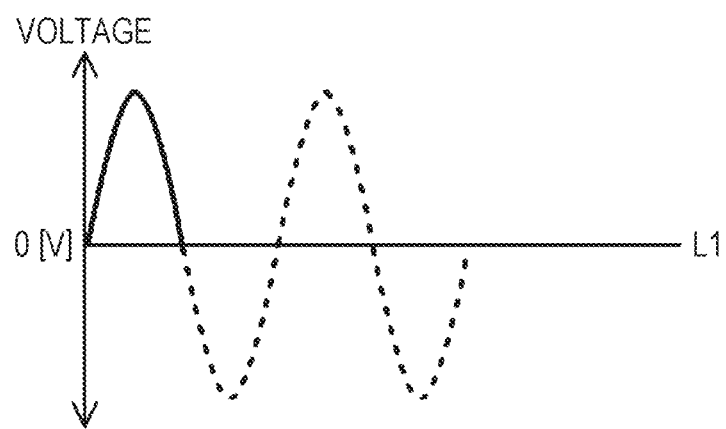
FIG. 5 is a diagram illustrating a waveform of a one-shot drive signal.

FIG. 5 is a diagram illustrating a waveform of the one-shot drive signal Sd. A region indicated by a solid line is a waveform of the one-shot drive signal Sd, and a region indicated by a dashed line does not constitute the one-shot drive signal Sd. In FIG. 5, an axis of abscissae indicates an elapsed time and an axis of ordinates indicates a voltage. Furthermore, in FIG. 5, a straight line L1 indicates 0 V. As illustrated in FIG. 5, the waveform of the one-shot drive signal Sd corresponds to a half period (it radians) of a sine wave with an initial phase of 0°. Thus, the one-shot drive signal Sd is a one-shot signal that rises to a positive side and has a voltage changing on the positive side, and has the following characteristics: the one-shot drive signal Sd (1) rises from 0 V to the positive side; (2) does not have a negative potential; and (3) is a one-shot signal.

When outputting the first specific control signal Sc-1 and then a period of time J1 has elapsed after a timing when the output of the first specific control signal Sc-1 is started (a timing when the first one-shot drive signal Sd-1 rises), the controller 21 outputs the specific control signal Sc to the drive circuit 22. Hereinafter, a specific control signal Sc output by the controller 21 following the first specific control signal Sc-1 is referred to as a "second specific control signal Sc-2". A value of the period of time J1 and the significance of the period of time J1 will be described below.

When receiving the second specific control signal Sc-2 from the controller 21, the drive circuit 22 outputs a one-shot drive signal Sd as a drive signal to the actuators 7 of the vibration units 5. Specifically, the drive circuit 22 energizes the coils 9 in accordance with a waveform of one-shot drive signal Sd. Hereinafter, the one-shot drive signal Sd output by the drive circuit 22 in response to the second specific control signal Sc-2 is especially referred to as a "second one-shot drive signal Sd-2". The second one-shot drive signal Sd-2 corresponds to a "second drive signal" in the claims.

Hereinafter, an operation of outputting a drive signal performed by the drive circuit 22 under the control of the controller 21 is expressed as follows: "the drive signal output section 20 outputs a drive signal". For example, an operation performed such that the controller 21 outputs the first specific control signal Sc-1 to the drive circuit 22 and the drive circuit 22 outputs the first one-shot drive signal Sd-1 in response to the first specific control signal Sc-1 is expressed as follows: "the drive signal output section 20 outputs the first one-shot drive signal Sd-1". Furthermore, for example, an operation performed such that the controller 21 outputs the second specific control signal Sc-2 to the drive circuit 22 and the drive circuit 22 outputs the second one-shot drive signal Sd-2 in response to the second specific control signal Sc-2 is expressed as follows: "the drive signal output section 20 outputs the second one-shot drive signal Sd-2".

Furthermore, hereinafter a timing when the period of time J1 has elapsed after a timing of start of an output of the first one-shot drive signal Sd-1 is simply referred to as "a timing when the period of time J1 has elapsed after an output of the first one-shot drive signal Sd-1" where appropriate.

Figure 6A:
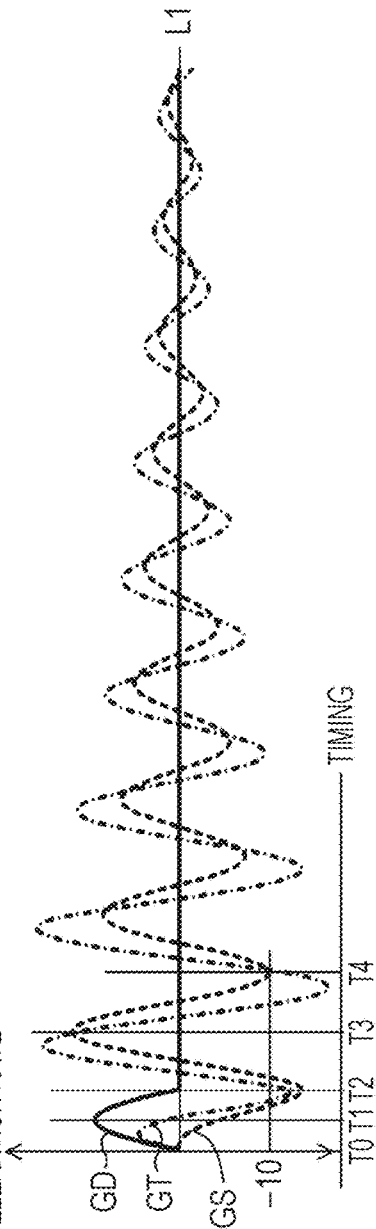
FIGS. 6A and 6B are diagrams illustrating transition of a voltage of the one-shot drive signal, a position of the vibrator, and an acceleration rate of the touch screen obtained when the one-shot drive signal is output.

The significance of the vibration generator 1 performing the above process will be described hereinafter along with a detailed description of the period of time J1. FIG. 6A is a graph of transition of a voltage of the one-shot drive signal Sd, transition of a Z-axis coordinate value in a position of the vibrator 13 (=displacement from the reference position), and transition of an acceleration rate of the touch screen 2, on coordinates having an axis of abscissae indicating an elapsed time, obtained when the drive signal output section 20 outputs the one-shot drive signal Sd only once.

In FIG. 6A, a graph indicated by a reference symbol GD represents the transition of a voltage of the one-shot drive signal Sd. An axis of ordinates of coordinates indicates a voltage and a straight line L1 indicates 0 V in the graph GD. In the graph GD, an upper side relative to the straight line L1 in the drawing indicate a positive potential whereas a lower side in the drawing indicates a negative potential. The graph GD plots voltages of the one-shot drive signal Sd at elapsed time points.

In FIG. 6A, a graph with a reference symbol GS represents the transition of the Z-axis coordinate value in a position of the vibrator 13. An axis of ordinates of coordinates indicates a Z-axis coordinate value and a straight line L1 indicates a Z-axis coordinate value of "0" in the graph GS. In the graph GS, an upper side relative to the straight line L1 in the drawing indicates a Z-axis positive direction whereas a lower side in the drawing indicates a Z-axis negative direction. The graph GS plots Z-axis coordinate values in positions of the vibrator 13 at elapsed time points.

In FIG. 6A, a graph indicated by a reference symbol GT represents the transition of an acceleration rate of the touch screen 2. An axis of ordinates of coordinates indicates an acceleration rate and a straight line L1 indicates 0 m/s 2 in the graph GT. In the graph GT, an upper side relative to the straight line L1 in the drawing indicates a positive acceleration rate whereas a lower side in the drawing indicates a negative acceleration rate. The graph GT plots acceleration rates of the touch screen 2 at elapsed time points.

Referring to FIG. 6A, when the drive signal output section 20 outputs the one-shot drive signal Sd to the actuators 7, a voltage of the one-shot drive signal Sd starts rising at a timing T0, reaches a peak at a timing T1, drops to 0 V at a timing T2, and thereafter the OV state is continued, as represented by the graph GD. As represented by the graph GS, in response to the output of the one-shot drive signal Sd, the vibrator 13 starts moving toward the Z-axis negative direction. Thus, in this embodiment, the one-shot drive signal Sd applies force that moves the vibrator 13 in the Z-axis negative direction. Specifically, when the one-shot drive signal Sd is input to the actuator 7 while the vibrator 13 is not vibrated, the Lorentz force that moves the vibrator 13 first in the Z-axis negative direction is generated. The Z-axis negative direction corresponds to the "first direction" in the claims, and the Z-axis positive direction corresponds to the "second direction" in the claims.

As represented by the graph GS, the vibrator 13 starts moving in the Z-axis negative direction at the timing T0, reaches a peak of the movement in the Z-axis negative direction at the timing T2, and stops. In FIG. 6A (and FIG. 6B described below), the timing when the one-shot drive signal Sd reaches 0 V and the timing when the movement of the vibrator 13 in the Z-axis negative direction reaches a peak coincide with each other, but these timings may be different.

A Z-axis coordinate value in a position of the vibrator 13 at the timing T2 is a negative value, and the position of the vibrator 13 at the timing T2 is on a negative side on the Z-axis relative to the reference position. After the timing T2, the vibrator 13 starts moving in the Z-axis positive direction due to elastic energy stored in the elastic member 11, passes the reference position, reaches a peak of the movement in the Z-axis positive direction at the timing T3, and stops. A Z-axis coordinate value in a position of the vibrator 13 at the timing T3 is a positive value, and a position of the vibrator 13 at the timing T3 is on a positive side on the Z-axis relative to the reference position. As represented by the graph GS, after the timing T3, the vibrator 13 vibrates along the Z-axis due to the elastic energy of the elastic member 11. In this case, amplitude of vibration of the elastic member 11 is gradually reduced because no external force is applied that contributes to the vibration of the elastic member 11. As can be seen from the transition of the acceleration rate of the touch screen 2 represented by the graph GT in FIG. 6A, the touch screen 2 vibrates in accordance with the vibration of the vibrator 13.

In the following description, a peak of a movement in the Z-axis negative direction is referred to as a "Z-axis negative peak" in the vibration of the vibrator 13. In FIG. 6A, the vibrator 13 has reached a Z-axis negative peak at the timing T2. Furthermore, a peak of a movement in the Z-axis positive direction is referred to as a "Z-axis positive peak". In FIG. 6A, the vibrator 13 has reached a Z-axis positive peak at the timing T3.

Next, vibration of the vibrator 13 and the touch screen 2 when the drive signal output section 20 outputs the first one-shot drive signal Sd-1 to the actuators 7 and outputs the second one-shot drive signal Sd-2 to the actuators 7 after the period of time J1 has elapsed will be described. This operation corresponds to an operation of the drive signal output section 20 according to this embodiment.

Figure 6B:
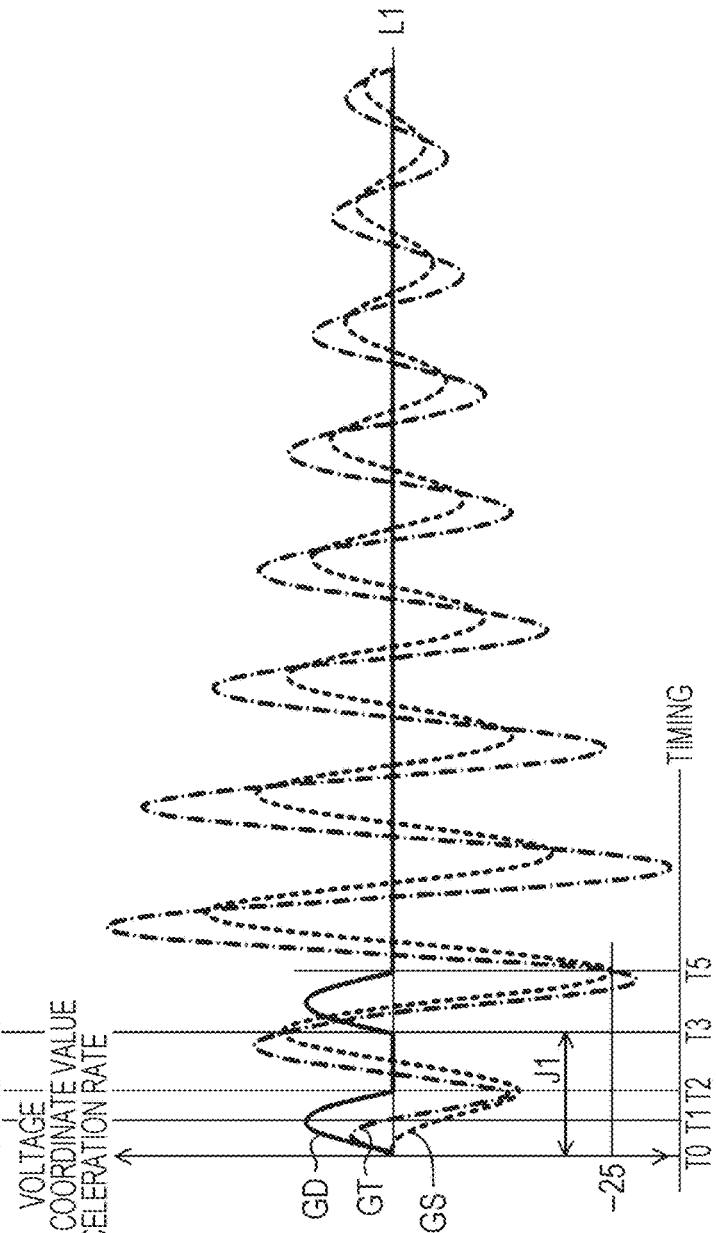

FIG. 6B is a diagram illustrating transition of a voltage of the one-shot drive signal Sd (the first one-shot drive signal Sd-1 and the second one-shot drive signal Sd-2), transition of the Z-axis coordinate value in a position of the vibrator 13, and transition of an acceleration rate of the touch screen 2 on the same coordinate as that of FIG. 6A. As with FIG. 6A, the reference symbol GD indicates the transition of a voltage of the one-shot drive signal Sd, the reference symbol GS indicates the transition of the Z-axis coordinate value in the position of the vibrator 13, and the reference symbol GT indicates the transition of an acceleration rate of the touch screen 2.

As shown in FIG. 6B, in response to the first one-shot drive signal Sd-1, the vibrator 13 starts moving in the Z-axis negative direction at the timing T0, reaches a peak of the movement in the Z-axis negative direction at the timing T2, and then stops once. At the timing T2, the vibrator 13 changes the direction of the movement and starts moving in the Z-axis positive direction, and stops once the movement when the movement in the Z-axis positive direction reaches its peak at the timing T3. The situation up to this point is the same as in FIG. 6A.

As illustrated in FIG. 6B, in this embodiment, the drive signal output section 20 starts an output of the second one-shot drive signal Sd-2 at the timing T3. More specifically, the drive signal output section 20 outputs the second one-shot drive signal Sd-2 to the actuators 7 such that the timing T3 when the movement of the vibrator 13 in the Z-axis positive direction reaches its peak coincides with a timing of start of rising of the second one-shot drive signal Sd-2. Note that, in this embodiment, the period of time J1 is determined in advance based on a pretest or a simulation so that the timing of the first Z-axis positive peak after the output of the first one-shot drive signal Sd-1 and the timing of the start of the rise of the second one-shot drive signal Sd-2 coincide with each other. Specifically, when the drive signal output section 20 outputs the first one-shot drive signal Sd-1 and then outputs the second one-shot drive signal Sd-2 when the period of time J1 has elapsed after the start timing of output of the first one-shot drive signal Sd-1, the timing of the first Z-axis positive peak coincides with the start timing of the rise of the second one-shot drive signal Sd-2. As illustrated in FIG. 6B, the period of time from the timing T0 to the timing T3 corresponds to the period of time J1.

As a result, when compared to the case where the second one-shot drive signal Sd-2 is not output, the amplitude of the vibration of the vibrator 13 is significantly increased. For example, referring to FIG. 6A, in the case where the second one-shot drive signal Sd-2 is not output, the first Z-axis negative peak is first reached at a timing T4 after the timing T3. A Z-axis coordinate value at the timing T4 is "−10". On the other hand, referring to FIG. 6B, when the second one-shot drive signal Sd-2 is output, the Z-axis negative peak is first reached at a timing T5 after the timing T3. The Z-axis coordinate value at the timing T5 is "−25". Thus, in the Z-axis negative peak that is first reached after the timing T3, the amplitude of the vibration obtained when the second one-shot drive signal Sd-2 is output is about 2.5 times larger than the amplitude of the vibration obtained when the second one-shot drive signal Sd-2 is not output.

The reason that the amplitude of the vibration of the vibrator 13 is significantly increased due to the input of the second one-shot drive signal Sd-2 at the timing T3 is as follows. Specifically, at the timing T3, the movement of the vibrator 13 in the Z-axis positive direction reaches its peak. At such a timing, the movement in the Z-axis positive direction of the vibrator 13 associated with the vibration stops, and in addition, elastic energy of the elastic member 11 supporting the vibrator 13 reaches its peak. Then, at such a timing, an output of the one-shot drive signal Sd (the second one-shot drive signal Sd-2) is started to apply force to move the vibrator 13 in the Z-axis negative direction, and accordingly, the movement of the vibrator 13 in the Z-axis negative direction is effectively accelerated.

The configuration of this embodiment has the following effects. Accordingly, the drive signal output from the drive signal output section 20 is a "one-shot signal that rises to the positive side and has a voltage changing on the positive side", and has the following characteristics: the drive signal (1) rises from 0 V to the positive side; (2) does not have a negative potential; and (3) is a one-shot signal. Therefore, the drive circuit 22 is not required to generate a negative potential or bias the drive signal, and accordingly, reduction in cost is achieved. Here, in this embodiment, since the drive signal output from the drive signal output section 20 is a one-shot signal, sufficiently strong vibration may not be obtained when only one-shot drive signal is output or a one-shot drive signal is randomly output to vibrate the vibrator 13 of the actuator 7, for example.

However, according to the present disclosure, the one-shot drive signal Sd applies force to move the vibrator 13 in the Z-axis negative direction (a first direction). In this embodiment, to vibrate the vibrator 13, the second one-shot drive signal Sd-2 is output after the first one-shot drive signal Sd-1 is output, so that the timing when the movement of the vibrator 13 reaches its peak in the Z-axis positive direction, which is the opposite direction of the Z-axis negative direction, coincides with the timing when the signal starts rising. Therefore, the movement of the vibrator 13 in the Z-axis positive direction due to the vibration peaks and the elastic energy peaks, and accordingly, at the timing when the movement in the Z-axis negative direction is started, the second one-shot drive signal Sd-2 may apply force to move the vibrator 13 in the Z-axis negative direction. Accordingly, the second one-shot drive signal Sd-2 may effectively accelerate the movement of the vibrator 13 in the Z-axis negative direction so as to suppress inappropriate weakening of the vibration of the vibrator 13.

Specifically, according to this embodiment, reduction in cost may be achieved while inappropriate weakening of the vibration generated by the vibration generator 1 is suppressed.

Figure 7:
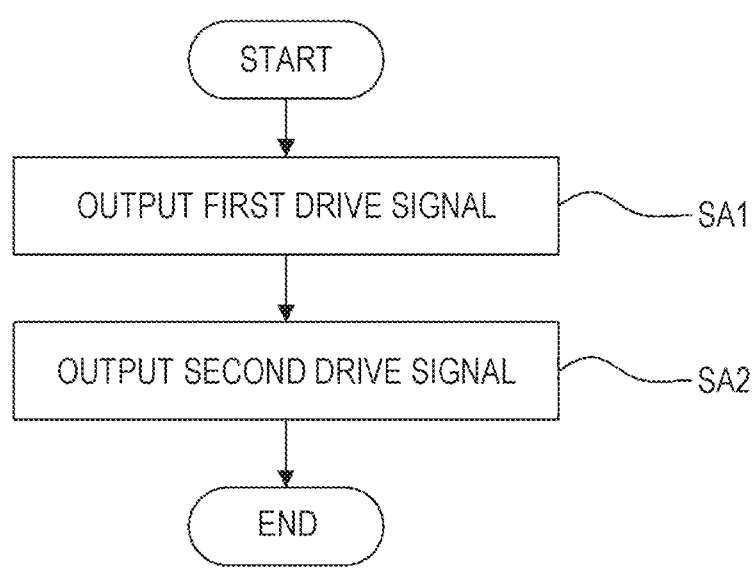
FIG. 7 is a flowchart of an example of an operation of the vibration generator according to the embodiment of the present disclosure.

Next, a method for generating vibration employed in the vibration generator 1 of this embodiment will be described with reference to flowcharts. FIG. 7 is a flowchart outlining operation of the vibration generator 1. As illustrated in FIG. 7, the drive signal output section 20 of the vibration generator 1 outputs, as a first drive signal, the one-shot drive signal Sd that rises on the positive side, that has a voltage changing on the positive side, and that applies force to move the vibrator 13 (the touch screen 2 (a vibration target) that vibrates in conjunction with the vibration of the vibrator 13 in modifications described below) in the Z-axis negative direction (the first direction) (step SA1). The drive signal output section 20 of the vibration generator 1 outputs, as a second drive signal, the one-shot drive signal Sd such that the timing when the movement of the vibrator 13 (a movement of the touch screen 2 (a vibration target) that vibrates in conjunction with the vibration of the vibrator 13 in the modifications below) in the Z-axis positive direction (the second direction) that is opposite to the Z-axis negative direction peaks coincides with the start timing of the rise of the signal (step SA2).

FIG. 8 is a flowchart illustrating operation of the vibration generator 1 in detail. As illustrated in FIG. 8, the controller 21 inputs a touch operation signal Ix (step SB1). Subsequently, the controller 21 determines whether a touch operation has been performed in the vibration generation mode (step SB2). When a touch operation has not been performed in the vibration generation mode (step SB2: NO), the process is terminated. When the touch operation has been performed in the vibration generation mode (step SB2: YES), the controller 21 outputs the first specific control signal Sc-1 to the drive circuit 22 (step SB3). In response to the first specific control signal Sc-1, the drive circuit 22 outputs the first one-shot drive signal Sd-1 (step SB4).

In addition, the controller 21 outputs the second specific control signal Sc-2 to the drive circuit 22 after the period of time J1 has elapsed from the start timing of the output of the first specific control signal Sc-1 (step SB5). In response to the second specific control signal Sc-2, the drive circuit 22 outputs the second one-shot drive signal Sd-2 (step SB6).

First Modification

Figure 9A:
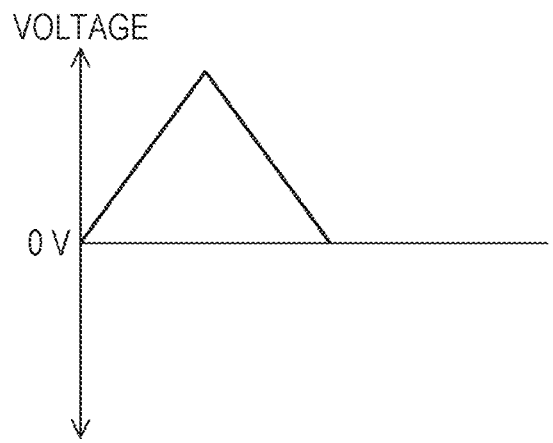
FIGS. 9A and 9B are diagrams illustrating other examples of a waveform of a one-shot drive signal.

Next, a first modification will be described. In the foregoing embodiment, a waveform of the one-shot drive signal Sd corresponds to a half period (π radians) of a sine wave with an initial phase of 0°. However, the one-shot drive signal Sd may have a triangular wave that rises to the positive side and does not shift to the negative side, as illustrated in FIG. 9A. In this case, the drive signal output section 20 outputs the second one-shot drive signal Sd-2 to the actuators 7 so that the timing T3 coincides with a timing of start of rise of the second one-shot drive signal Sd-2 configured by the triangular wave. Even with this configuration, the same effects as described in the foregoing embodiment may be achieved.

Figure 9B:
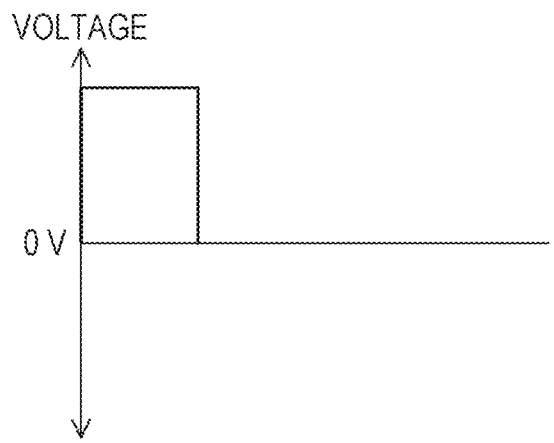
Figure 10:
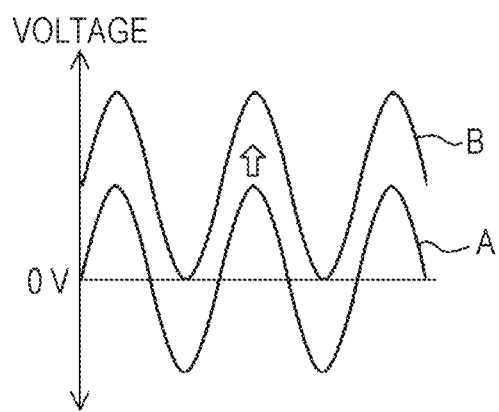
FIG. 10 is a diagram used to illustrate problems in a conventional approach.

Furthermore, as illustrated in FIG. 9B, a pulse wave that rises to the positive side and does not shift to the negative side may be employed. In this case, the drive signal output section 20 outputs the second one-shot drive signal Sd-2 to the actuators 7 so that the timing T3 coincides with a timing of start of rise of the second one-shot drive signal Sd-2 configured by the pulse wave. Even with this configuration, the same effects as described in the foregoing embodiment may be achieved.

Second Modification

Next, a second modification will be described. In the foregoing embodiment, the drive signal output section 20 outputs the second one-shot drive signal Sd-2 so that the timing when the movement of the vibrator 13 in the Z-axis positive direction peaks (the timing T3 in FIG. 6B) coincides with the timing of start of rise of the second one-shot drive signal Sd-2. However, the drive signal output section 20 may output the second one-shot drive signal Sd-2 such that a timing when the movement of the touch screen 2 (a vibration target) in the Z-axis positive direction peaks coincides with a timing of start of rise of the second one-shot drive signal Sd-2.

According to this configuration, at the timing when the movement of touch screen 2 in the Z-axis positive direction peaks, the second one-shot drive signal Sd-2 may be output to effectively increase amplitude of vibration of the touch screen 2.

Third Modification

Next, a third modification will be described. In the foregoing embodiment, the period of time J1 is determined in advance based on a pretest and a simulation, and the drive signal output section 20 outputs the second one-shot drive signal Sd-2 at a timing when the predetermined period of time J1 has elapsed after the first one-shot drive signal Sd-1 is output. However, the following configuration may be used. Specifically, a certain sensor is provided to detect a state of vibration of the vibrator 13 (or the touch screen 2 in the case of the second modification). Examples of the certain sensor include a sensor for detecting an acceleration rate of the vibrator 13 and a sensor for detecting a Z-axis coordinate value of the vibrator 13. Then, after outputting the first one-shot drive signal Sd-1, the drive signal output section 20 may detect or predict, based on a detection value of the sensor, a timing when a movement of the vibrator 13 in the Z-axis positive direction peaks, and output the second one-shot drive signal Sd-2 at the detected or predicted timing.

Fourth Modification

Next, a fourth modification will be described. In the above embodiment, the drive signal output section 20 outputs the first one-shot drive signal Sd-1 and then outputs the second one-shot drive signal Sd-2 only at a timing when a movement of the vibrator 13 in the Z-axis positive direction reaches its "first" peak. In this regard, the drive signal output section 20 may output the first one-shot drive signal Sd-1 and subsequent one-shot drive signals Sd in a manner different from that of the foregoing embodiment. For example, the drive signal output section 20 may output a one-shot drive signal Sd at a timing when a movement of the vibrator 13 in the Z-axis positive direction peaks at a second time or subsequent times, or may output a one-shot drive signal Sd at two or more timings. Even with the above configuration, when compared to the case where only the first one-shot drive signal Sd-1 is output, amplitude of vibration of the vibrator 13 may be effectively increased.

The present disclosure may be embodied in various modes without departing from the scope and main features of the present disclosure.

For example, although the vibration generator 1 generates vibration on the touch screen 2 installed in the vehicle in the foregoing embodiment, a target to be vibrated by the vibration generator 1 is not limited to components installed in the vehicle, and the vibration generator 1 may vibrate any type of component other than the touch screen 2.

Furthermore, a specific configuration of the actuators 7 and a method are not limited to those illustrated in the foregoing embodiment. That is, any configuration or any method may be employed as long as the vibrator 13 is vibrated in accordance with a drive signal.

Furthermore, the vibrator 13 vibrates in a normal direction relative to the screen of the touch screen 2 (in the direction along the Z axis) in the foregoing embodiment. However, the direction in which the vibrator 13 (and a vibration target vibrated in conjunction with the vibrator) vibrates is not limited to the direction illustrated in this embodiment. For example, the vibrator 13 may vibrate in a direction parallel to the screen of the touch screen 2 (a horizontal direction or a vertical direction, for example).

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A vibration generator that outputs a drive signal to an actuator that vibrates a vibrator supported by an elastic member in response to the drive signal, the vibration generator comprising:

a drive signal output section configured to output the drive signal to the actuator, wherein the drive signal output section outputs a one-shot drive signal not having negative potential, as a first drive signal to the actuator, and thereafter outputs a one-shot drive signal not having a negative potential, as a second drive signal to the actuator, wherein the first drive signal rises to a positive side when the vibrator is vibrated, has a voltage changing on the positive side, and adds a force to move the vibrator or a vibration target vibrating in conjunction with the vibration of the vibrator in a first direction, wherein the second drive signal is output such that a timing when a movement of the vibrator or the vibration target reaches a first peak of the movement in a second direction coincides with a timing of start of rise of the second drive signal, wherein the second direction is opposite to the first direction, and wherein the amplitude of the vibration of the vibrator is increased due to the input of the second drive signal.

2. The vibration generator according to claim 1, wherein the one-shot drive signal is a wave for half a period of a sine wave with an initial phase of 0°, a triangular wave, or a pulse wave.

3. The vibration generator according to claim 2, wherein
   the elastic member is attached to a base member, and the vibrator is supported by the base member through the elastic member in a vibration available state, and
   the vibration target is a member that is vibrated integrally with the base member and that is subjected to a touch operation performed by a user.

4. The vibration generator according to claim 1, wherein
   the elastic member is attached to a base member, and the vibrator is supported by the base member through the elastic member in a vibration available state, and
   the vibration target is a member that is vibrated integrally with the base member and that is subjected to a touch operation performed by a user.

5. The vibration generator according to claim 1, wherein the one-shot drive signal is a wave for half a period of a sine wave with an initial phase of 0°, a triangular wave, or a pulse wave.

6. The vibration generator according to claim 5, wherein
   the elastic member is attached to a base member, and the vibrator is supported by the base member through the elastic member in a vibration available state, and
   the vibration target is a member that is vibrated integrally with the base member and that is subjected to a touch operation performed by a user.

7. A vibration generation method employed in a vibration generator that outputs a drive signal to an actuator that vibrates a vibrator supported by an elastic member in response to the drive signal, the vibration generation method comprising:
   a step of outputting, by a drive signal output section of the vibration generator, a one-shot drive signal not having a negative potential to the actuator, as a first drive signal, that rises to a positive side, has a voltage changing on the positive side, and adds a force to move the vibrator or a vibration target vibrating in conjunction with the vibration of the vibrator in a first direction; and
   a step of outputting, by the drive signal output section of the vibration generator, a one-shot drive signal not having a negative potential to the actuator, as a second drive signal, such that a timing when a movement of the vibrator or the vibration target reaches a first peak of the movement in a second direction coincides with a timing of start of rise of the second drive signal, wherein the second direction is opposite to the first direction, and wherein the amplitude of the vibration of the vibrator is increased due to the input of the second drive signal.

8. The vibration generation method according to claim 7, wherein the one-shot drive signal is a wave for half a period of a sine wave with an initial phase of 0°, a triangular wave, or a pulse wave.

9. The vibration generation method according to claim 8, wherein
   the elastic member is attached to a base member, and the vibrator is supported by the base member through the elastic member in a vibration available state, and
   the vibration target is a member that is vibrated integrally with the base member and that is subjected to a touch operation performed by a user.

10. The vibration generation method according to claim 7, wherein
    the elastic member is attached to a base member, and the vibrator is supported by the base member through the elastic member in a vibration available state, and
    the vibration target is a member that is vibrated integrally with the base member and that is subjected to a touch operation performed by a user.

11. The vibration generation method according to claim 7, wherein the one-shot drive signal is a wave for half a period of a sine wave with an initial phase of 0°, a triangular wave, or a pulse wave.

12. The vibration generation method according to claim 11, wherein
    the elastic member is attached to a base member, and the vibrator is supported by the base member through the elastic member in a vibration available state, and
    the vibration target is a member that is vibrated integrally with the base member and that is subjected to a touch operation performed by a user.

\* \* \* \* \*